United States Patent [19]

Minezawa et al.

[11] Patent Number: 5,365,431
[45] Date of Patent: Nov. 15, 1994

[54] CONTROL OF ELECTRIC VEHICLE MOTORS RESPONSIVE TO DETECTED VEHICLE SPEED AND REQUIRED TOTAL DRIVING FORCE

[75] Inventors: Yukihiro Minezawa; Mutsumi Kawamoto, both of Tokyo; Hidemitsu Inagaki, Nishio; Yutaka Hotta, Chiryu, all of Japan

[73] Assignee: Aisin Aw Co., Ltd., Japan

[21] Appl. No.: 690,834

[22] Filed: Apr. 24, 1991

[51] Int. Cl.$^5$ .............................................. B60L 15/20
[52] U.S. Cl. ............................. 364/424.01; 180/65.1; 180/65.8
[58] Field of Search ............... 180/197, 242, 65.1, 180/65.5, 65.8, 6.28, 6.48, 6.5, 907; 364/424.01, 426.01, 426.03, 426.05

[56] References Cited

U.S. PATENT DOCUMENTS

| | | | |
|---|---|---|---|
| 3,845,368 | 10/1974 | Elco | 180/65.8 X |
| 4,498,551 | 2/1985 | Arbisi | 180/65.5 |
| 4,825,131 | 4/1989 | Nozaki et al. | 180/197 X |
| 5,148,883 | 9/1992 | Tanaka et al. | 180/65.8 X |

*Primary Examiner*—Vincent N. Trans
*Attorney, Agent, or Firm*—Lorusso & Loud

[57] ABSTRACT

An electric motor vehicle having a plurality of motors mounted thereon as a driving force source includes a detector for detecting the vehicle speed; a detector for detecting the load applied to the wheels; a calculating device for selecting a detected value of either one of these detectors and for determining driving force command values for respective motors corresponding to the wheels on the basis of the detected value selected and driving force values required of the electric motor vehicle; and a controller for controlling the driving forces of the motors on the basis of the driving force command values of the calculating device.

11 Claims, 8 Drawing Sheets

| REQUIRED DRIVING FORCE \ VEHICLE SPEED / MOTOR | 0 | | | | N(1) | | | | N(2) | | | |
|---|---|---|---|---|---|---|---|---|---|---|---|---|
| | 85 | 86 | 87 | 88 | 85 | 86 | 87 | 88 | 85 | 86 | 87 | 88 |
| 0 | 0 | 0 | 0 | 0 | 0 | 0 | 0 | 0 | 0 | 0 | 0 | 0 |
| T(1) | 1 | 1 | 0 | 0 | 1 | 1 | 0 | 0 | 1 | 1 | 0 | 0 |
| T(2) | 2 | 2 | 0 | 0 | 2 | 2 | 0 | 0 | 2 | 2 | 0 | 0 |
| T(3) | 3 | 3 | 0 | 0 | 3 | 3 | 0 | 0 | 2 | 2 | 0 | 0 |
| T(4) | 3 | 3 | 1 | 1 | 3 | 3 | 1 | 1 | 2 | 2 | 1 | 1 |
| T(5) | 3 | 3 | 2 | 2 | 3 | 3 | 2 | 2 | 3 | 3 | 2 | 2 |
| T(6) | 3 | 3 | 3 | 3 | 3 | 3 | 3 | 3 | 3 | 3 | 3 | 3 |

*FIG. 4*

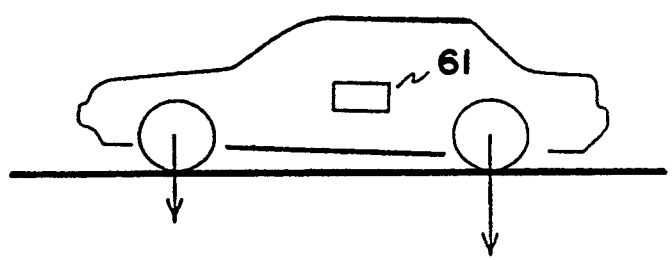
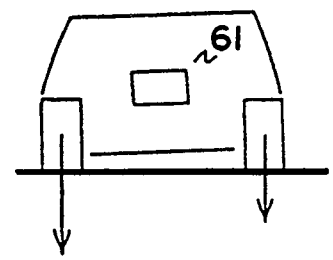
FIG.6(a)        FIG.6(b)
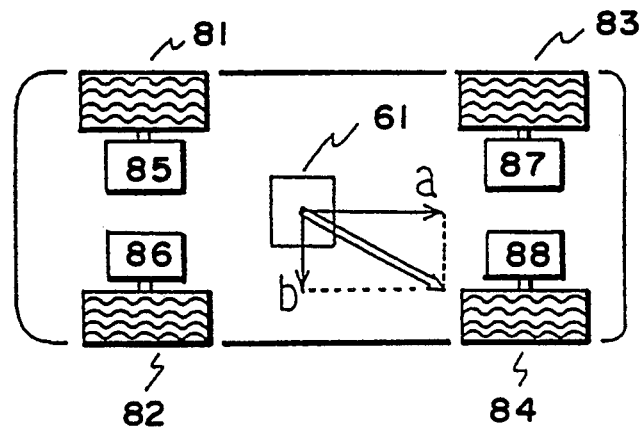
FIG.6(c)

CONTROL OF ELECTRIC VEHICLE MOTORS RESPONSIVE TO DETECTED VEHICLE SPEED AND REQUIRED TOTAL DRIVING FORCE

BACKGROUND OF THE INVENTION

1. Field of the Invention

The present invention relates to an electric motor vehicle having an electric motor mounted thereon as a driving power source, and particularly to an electric motor vehicle having a plurality of electric motors mounted thereon.

2. Description of the Related Art

Conventionally, there are known electric motor vehicles with one electric motor mounted thereon as a driving power source. With such electric motor vehicles, drawbacks are experienced in that there are limitations to the driving force, the efficiency is poor, and it is impossible to effect fine control according to a driver's requirements as in the case of four-wheel drive.

On the other hand, electric motor vehicles with a plurality of motors mounted thereon as a driving power source have been proposed, as shown in FIG. 9(a), (b), and (c).

FIG. 9(a) shows an example in which two motors are disposed in series to drive front wheels or rear wheels. FIG. 9(b) shows an example in which the front wheels and rear wheels are respectively driven by two separately provided motors. FIG. 9(c) shows an example in which the four wheels are respectively driven by four individual motors. In the drawings, reference numerals 51–62 denote wheels; 63–70, motors, and 71–73, differential gears. With such conventional arrangements, however, since control is effected by balancing the plurality of motors in such a manner that all of their outputs become identical, there has been a drawback in that the overall efficiency of the electric motor vehicle is poor.

To give a detailed description in this regard, first, the efficiency of a motor in general varies according to the rotational speed and output torque, as shown in FIG. 7. For example, if consideration is given to the efficiency when the vehicle is driven by two motors, as in the case of FIGS. 9(a) and 9(b), when the vehicle is running with each motor rotating at the rotational speed "A" in FIG. 7 and if the driver operates an accelerator pedal and requires torque "B" with respect to the vehicle, in a conventional vehicle, the two motors are controlled such that they output "B/2" of torque, respectively, so that the efficiency is only "X". However, if the torque "B" is within a range which can be sufficiently handled by one motor, if control is effected such that the output of one motor becomes "B" and the output of the other motor becomes zero, the efficiency becomes "Y(>X)", with the result that the efficiency can be increased.

Particularly in the case of an electric motor vehicle which runs with one or more batteries mounted thereon, since the weight of the batteries is generally large, there is a drawback in that the traveling distance is short as compared with a gasoline engine vehicle. Accordingly, an increase in the efficiency of the vehicle has been a very important objective in the technical field of electric motor vehicles in the light of the reduction of the weight of batteries, an increase in the traveling distance, and so on.

SUMMARY OF THE INVENTION

Accordingly, it is an object of the present invention to provide an electric motor vehicle having high overall efficiency by individually determining driving force command values for respective electric motors on the basis of the speed of the electric motor vehicle, i.e., the rotational speed of the motors, and driving force values required of the vehicle in such a manner that the overall efficiency of the vehicle becomes optimum, and by controlling the motors according to the values, thereby overcoming the above-described drawback of the conventional art.

To this end, in accordance with the present invention there is provided an electric motor vehicle having a plurality of motors mounted thereon as a driving power source, comprising: detecting means for detecting the speed of the electric motor vehicle; calculating means for determining driving force command values for the plurality of motors, respectively, on the basis of a detected value of the detecting means and a driving force value required of the electric motor vehicle, in such a manner that the overall efficiency of the electric motor vehicle becomes optimum; and controlling means for controlling the driving forces of the motors on the basis of the driving force command values of the calculating means.

With the electric motor vehicle in accordance with the present invention, since the arrangement provided is such that a plurality of motors are controlled individually on the basis of the vehicle speed, i.e., the rotational speed of the motors, which determines the efficiency of the mounted motors, as well as driving force values required of the vehicle, in such a manner that the efficiency becomes optimum, it is possible to increase the overall efficiency of the electric motor vehicle, and it is possible to increase the traveling distance of the vehicle. In addition, since the capacity of each battery can be made small, it is possible to reduce the weight of the vehicle and to further increase the traveling distance coupled with the improvement in efficiency.

The above and other objects, features and advantages of the present invention will become more apparent from the following detailed description of the invention when read in conjunction with the accompanying drawings.

BRIEF DESCRIPTION OF THE DRAWINGS

FIG. 4 is a diagram illustrating an example of a driving force map for determining driving force command values for respective motors on the basis of a vehicle speed, by the calculating means of the embodiment shown in FIG. 2;

FIGS. 6(a), 6(b) and 6(c) are views illustrating another embodiment in which an acceleration sensor is used as a load sensor;

DESCRIPTION OF THE PREFERRED EMBODIMENTS

Referring now to the accompanying drawings, a description will be given of the preferred embodiments of the present invention.

Figure 1:
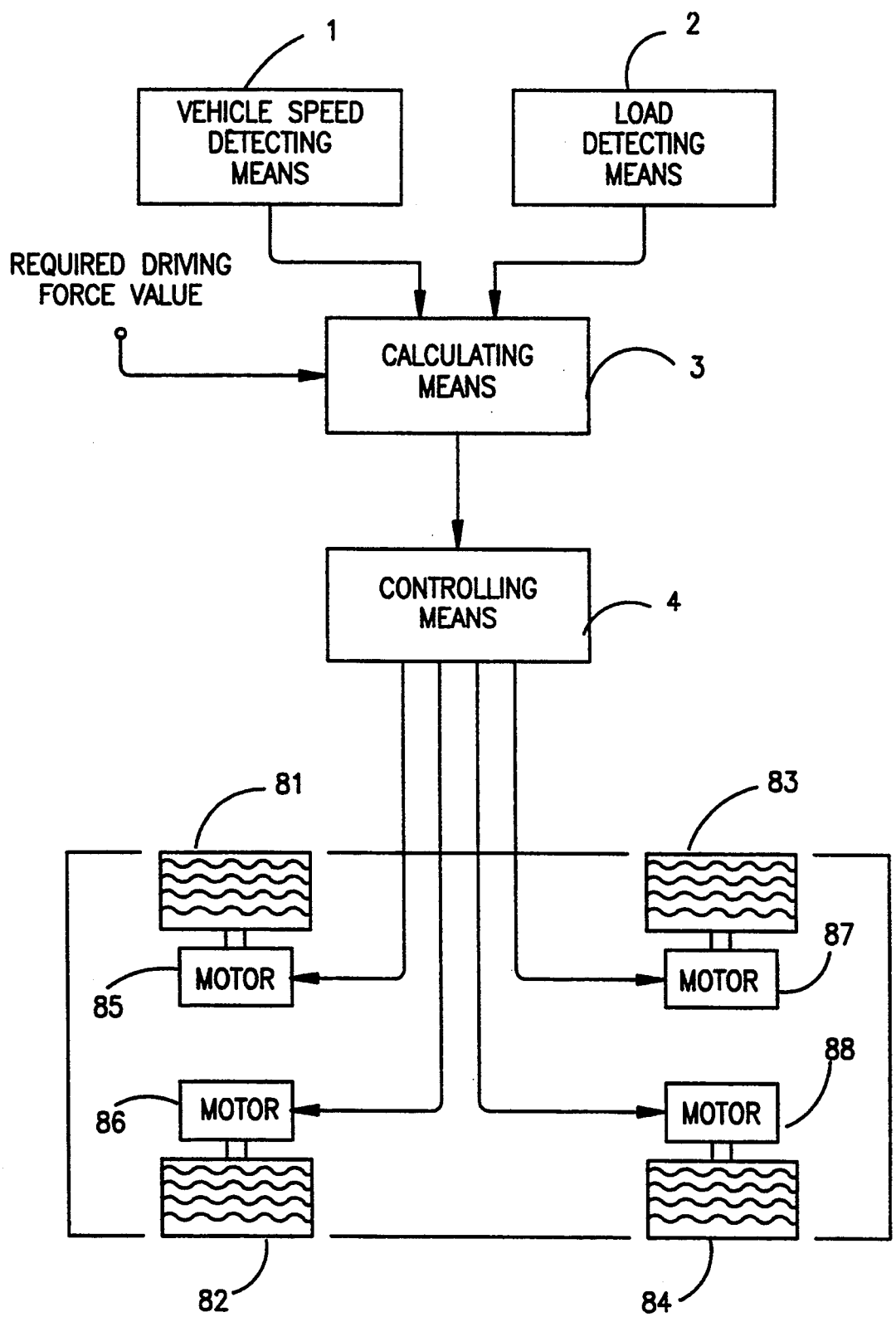
FIG. 1 is a diagram illustrating schematic construction of an electric motor vehicle in accordance with the present invention.

As shown in FIG. 1, an electric motor vehicle in accordance with the present invention is equipped with a detecting means 1 for detecting the speed of the electric motor vehicle; a detecting means 2 for detecting the load applied to wheels 81–84; a calculating means 3 for selecting a detected value of either one of these detecting means and for determining driving force command values for respective motors 85–88 corresponding to the wheels 81–84 on the basis of the detected value selected and driving force values required of the electric motor vehicle; and a controlling means for controlling the driving forces (outputs) of the motors 85–88 on the basis of the driving force command values of the calculating means 3.

Figure 2:
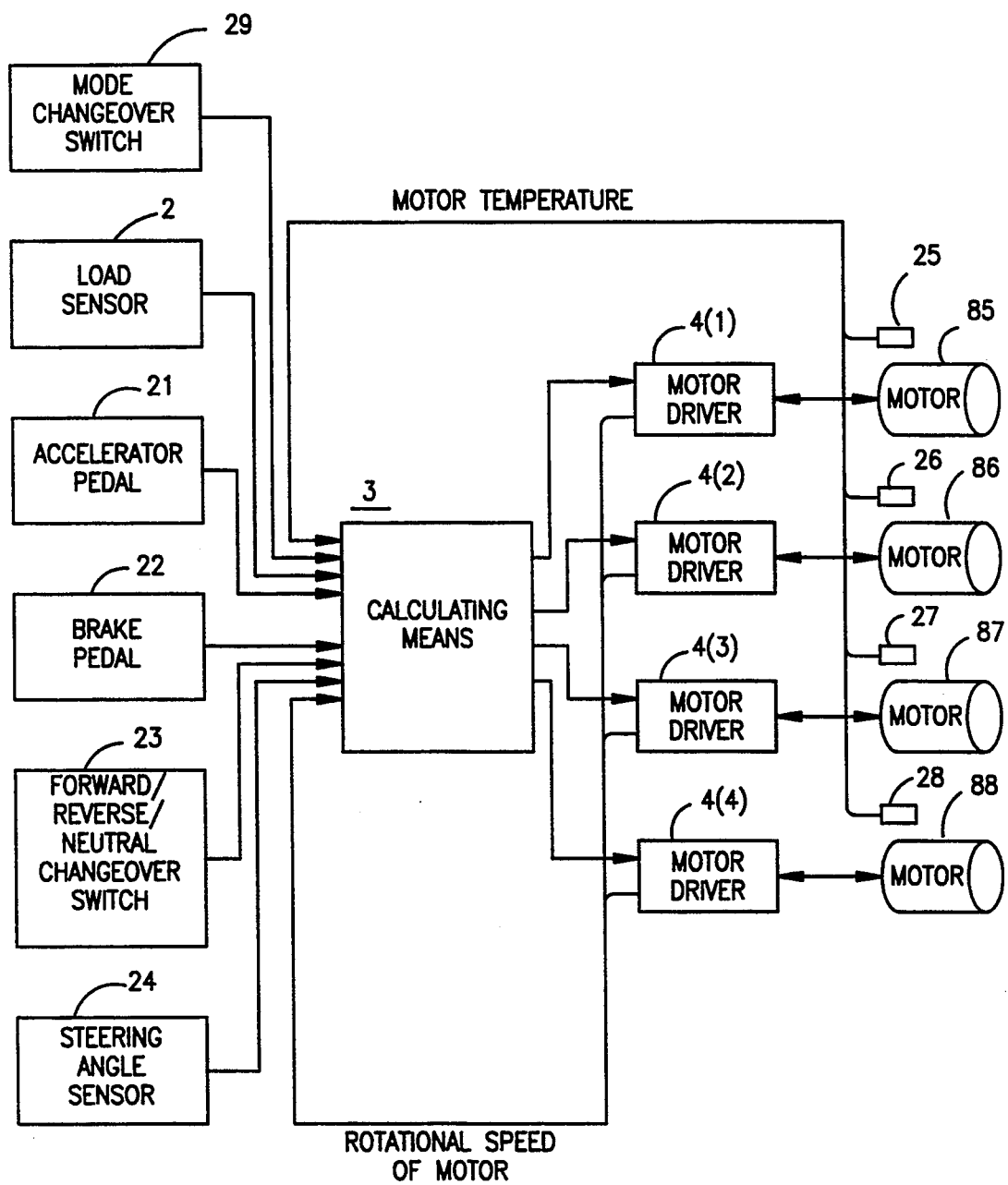
FIG. 2 is a diagram illustrating one embodiment of the present invention.

FIG. 2 shows one embodiment in which detected values of the rotational speed of the motors 85–88 are inputted to the calculating means as a detected value of the vehicle speed, and a detected value of a load sensor 2 is also inputted. As the motors 85–88 in this case, for instance, DC brushless motors may be used. In that case, motor drivers 4(1)–4(4)—4(4) can be used also as the means for detecting the rotational speed of the respective motors by making use of a resolver signal of each motor.

In addition, a value of the amount of depression of an accelerator pedal 21 is inputted to the calculating means 3 as a signal representing a driving force value required of the electric motor vehicle. Furthermore, an output signal of a forward/reverse/neutral changeover switch 23 is inputted to the calculating means 3 for determining the direction of driving force of the respective motors 85–88, i.e., the direction of rotation, and a value of the amount of depression of brake pedal 22 is also inputted thereto for determining a driving force at the time of braking.

Furthermore, in this embodiment, a mode changeover switch 29 is provided to allow the driver to select whether to emphasize optimum efficiency or optimum driving force, or to allow automatic selection. Also, in order to correct the driving force command values for the respective motors 85–88, in addition to the aforementioned values, a detected value of a steering angle sensor 24 and detected values of motor temperature sensors 25–28 provided on the motors 85–88 are inputted to the calculating means 3.

Figure 3:
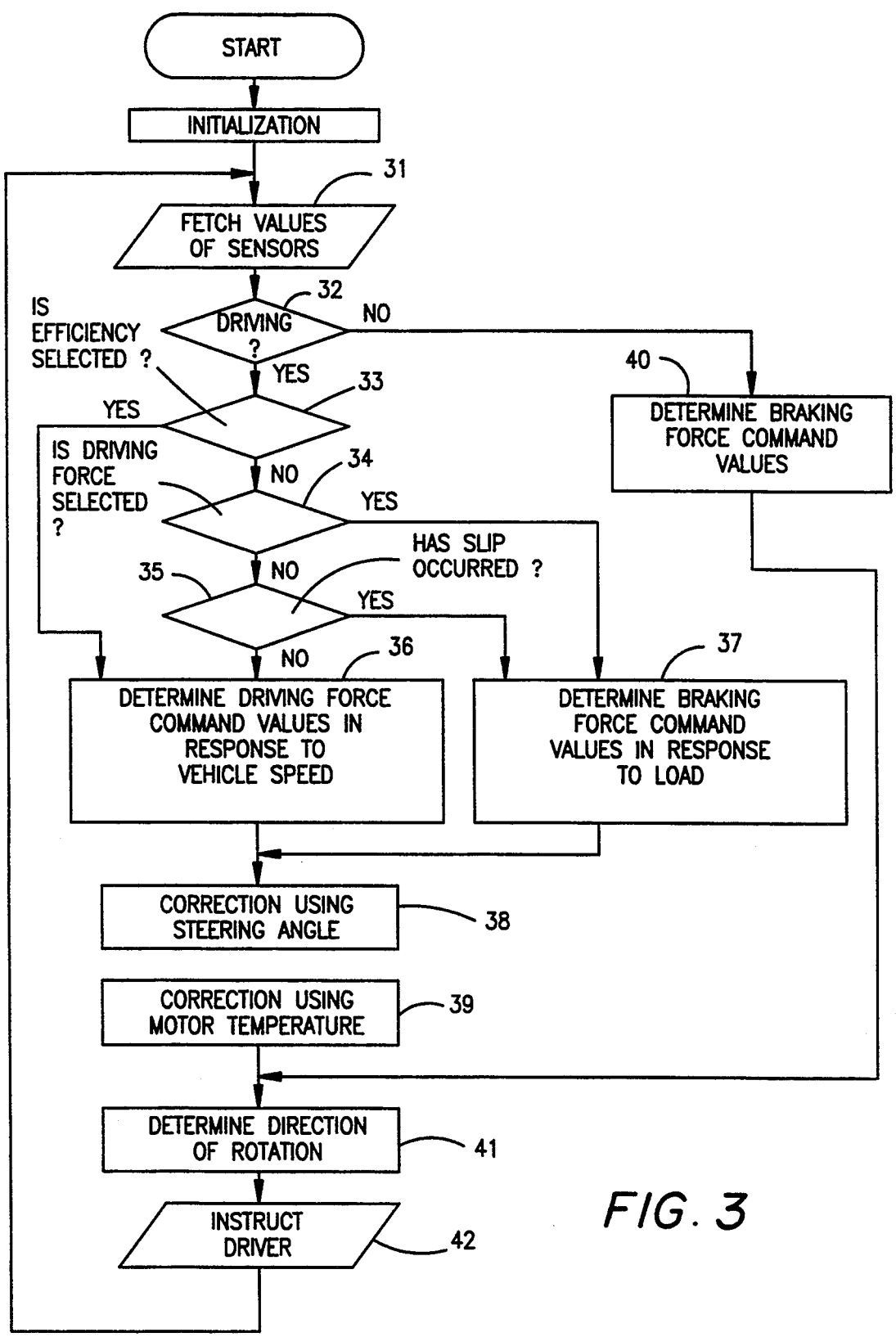
FIG. 3 is a flowchart explaining the control processing by a calculating means of the embodiment shown in FIG. 2.

Referring now to a flowchart shown in FIG. 3, a description will be given of the flow of processing by the calculating means in the embodiment shown in FIG. 2.

In this embodiment, after receiving the values of the sensors and the like (Step 31), the calculating means 3 makes a comparison between the amount of the accelerator pedal 21 depression and the amount of the brake pedal 22 depression to determine whether driving or braking is being effected (Step 32). Here, if a signal representing the amount of depression of the accelerator pedal 21 has been inputted, it is determined that driving is to be effected (YES), and a determination is then made as to what mode has been selected by the mode changeover switch 29 (Steps 33–35).

Figure 7:
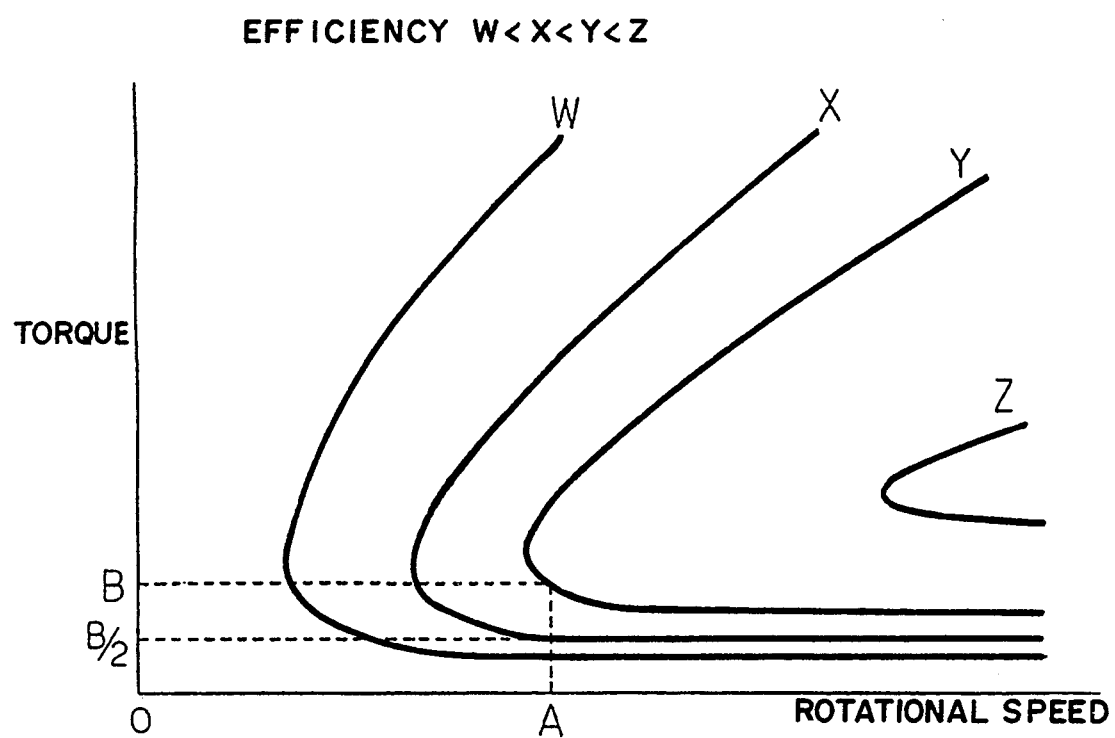
FIG. 7 is a diagram illustrating the rotational speed torque characteristic of the motor.
Figure 8:
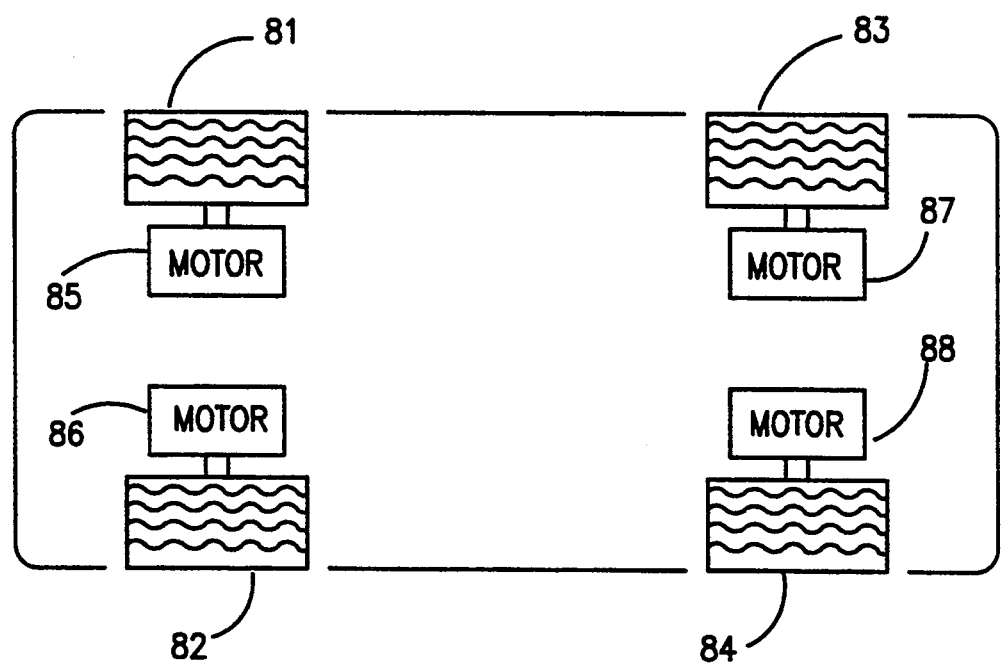
FIG. 8 is a diagram illustrating an example of arrangement of an electric motor vehicle to which the present invention is suitably applied.

At this time, if the mode changeover switch 29 has been switched to "emphasis on vehicle efficiency" (i.e., if "YES" is the answer in the determination in Step 33), driving force command values for the respective motors 85–88 are determined on the basis of the amount of the accelerator pedal 21 depression and the detected value of the rotational speed of each motor inputted as a detected value of the vehicle speed (Step 36). To effect this processing (Step 36), relationships among the rotational speed of the motor, torque, and efficiency as shown in FIG. 7 are stored in advance, and the distribution of driving forces (outputs) of the respective motors 85–88 is calculated in such a manner that the overall efficiency of the vehicle becomes optimum. It should be noted that this calculation may be conducted in correspondence with rotational speed ranges and torque ranges divided in advance into appropriate segments, and a "driving force map" prepared as a result may be stored in advance. One example of this drive force map is illustrated in FIG. 4. When the driving force map is used, it suffices if a determination is first made in the processing in Step 36 as to which segment of the divided vehicle speed range and which segment of the required driving force range of the map the value of the vehicle speed and the value of the required driving force inputted at that time correspond to respectively, and then an allotted driving force value stored at that point of intersection is read. For instance, in the example shown in FIG. 4, if the vehicle speed is in the range N(2) and the required driving force value is in the range T(3), it is determined that the driving force command values for the motors 85 and 86 are "2", and the driving force command values for the motors 87 and 88 are "1".

In addition, if the mode changeover switch 29 has been set to "emphasis placed on optimum driving force" (i.e., NO is the answer in the determination in Step 33, and YES is the answer in the determination in Step 34), the driving force command values for the respective motors 85–88 are determined on the basis of the amount of the accelerator pedal 21 depression and a detected value of the load being applied to the wheels (Step 37).

Figure 5:
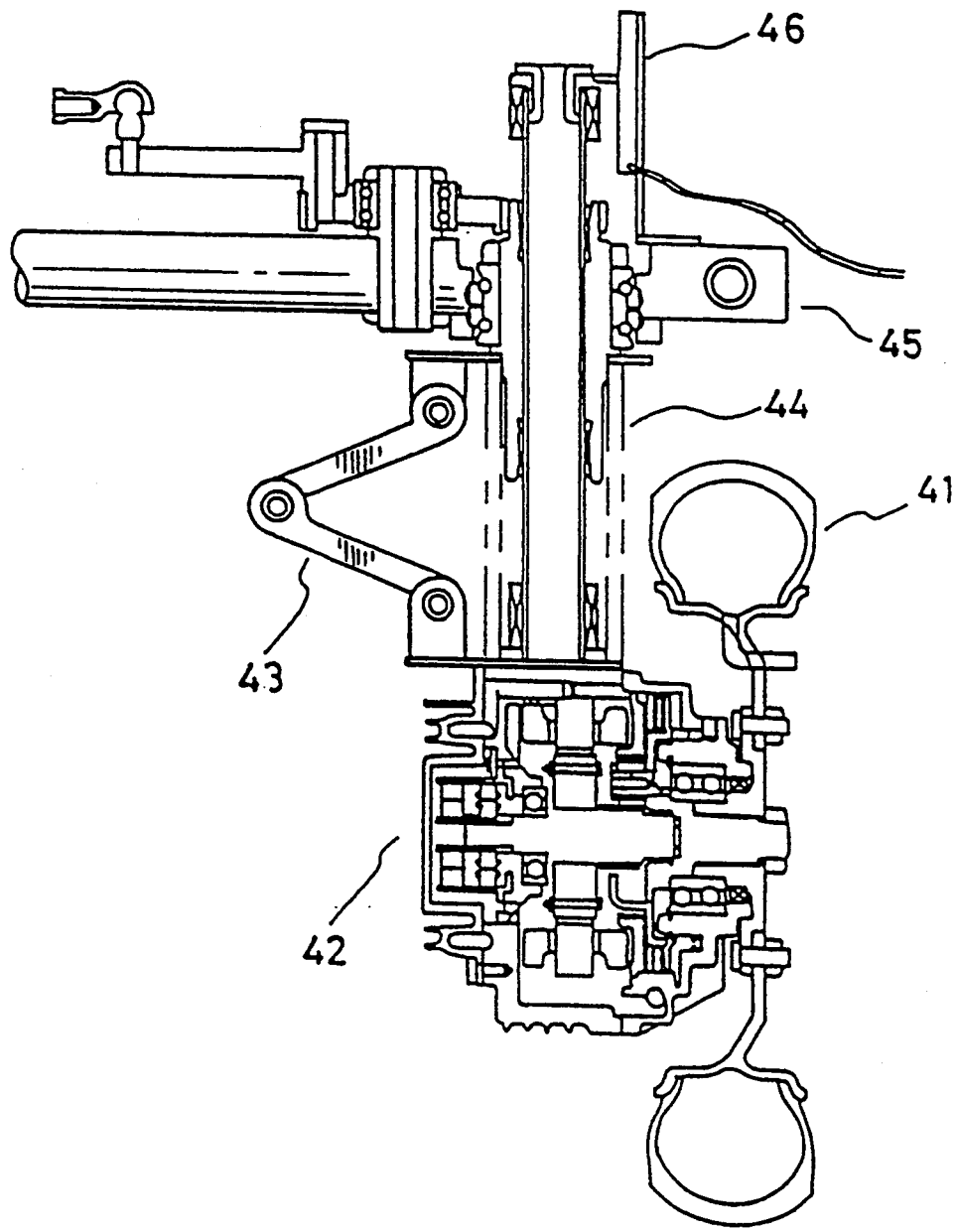
FIG. 5 is a diagram illustrating an example of the arrangement of a load sensor.

Here, to detect the load being applied to the wheels 81–84, it suffices if, for example, load sensors are provided for the respective wheels 81–84. An example of the arrangement of the load sensor in this this case is shown in FIG. 5. In FIG. 5, reference numeral 51 denotes a wheel; 52, a motor; 53, a torque link; 54, a suspension spring; 55, a main frame of a chassis; and 56, a load sensor body. In this arrangement, the load sensor 56 is constituted by a potentiometer, and either one of a nonsliding member (resistor) or a sliding member is mounted on the main frame 55 of the chassis, and the other is mounted on a portion moving together with the motor 52. The load being applied to the wheel 51 is detected on the basis of an amount of compression of the suspension spring 54.

If detected values of the load on the wheels 81–84 thus detected are a, b, c, and d, respectively, in the aforementioned processing in Step 37, the driving force command values for the respective motors 85–88 are determined in accordance with, for instance, ratios of the detected values of the load, as follows:

Command value for the motor 85: $(a/K) \times A$
Command value for the motor 86: $(b/K) \times A$
Command value for the motor 87: $(c/K) \times A$ Command value for the motor 88: $(d/K) \times A$
(where $K = a+b+c+d$, and A is an amount of the accelerator pedal depression)

FIG. 6 shows another example of arrangement for detecting the load applied to the wheels 81–84. In this example of arrangement, an acceleration sensor 61 is mounted on the electric motor vehicle. This acceleration sensor 61 is preferably positioned in the vicinity of the center of gravity of the electric motor vehicle. An inclination of the vehicle is detected on the basis of the detected value of the acceleration sensor 61. Since the inclination of the vehicle indicates the direction in which the load is being applied, it follows that the amounts corresponding to each load being applied to the wheels 81–84 can be detected in this case as well.

In the example shown in FIG. 6, if an amount proportional to a component of the detected value (vector) of the acceleration sensor 61 is a in the axial direction of the vehicle and b in a direction perpendicular to that direction as shown in the drawing, in the aforementioned processing in Step 37, the driving force command values for the respective motors 85–88 are determined on the basis of these values a and b, as follows:

Command value for the motor 85: $(A/4) - a - b$
Command value for the motor 86: $(A/4) - a + b$
Command value for the motor 87: $(A/4) + a - b$
Command value for the motor 88: $(A/4) + a + b$
(where A is an amount of the accelerator pedal depression)

In addition, returning to the determination concerning the mode changeover switch 29, if "automatic selection" has been selected by the switch (i.e., NO are the answers in both determinations in Steps 33 and 34), a determination is made in Step 35 as to whether to execute the processing of Step 36 or 37 on the basis of a preset condition.

As a condition for making such a determination, one example is "whether or not slip has occurred". It can be determined that slip has occurred when the amount of change in the rotational speed of the wheels was unrealistic for a vehicle, and when there was a large difference in the rotational speeds among the four wheels. That is, when it is detected that slip has occurred (in the case of YES in the determination in Step 35), the aforementioned processing in Step 37 is selected to obtain an appropriate driving force, and in cases other than that (in the case of NO in the determination in Step 35), the aforementioned processing in Step 36 is executed by placing emphasis on the vehicle efficiency.

Although in the foregoing embodiment a description has been given of a case where the mode changeover switch 29 is provided, this mode changeover switch 29 is not an essential constituent feature of this embodiment, and all the switching operations may be effected automatically. In that case, the determinations in Steps 33 and 34 are omitted in the flow of processing shown in FIG. 3.

Normally, the driving force command values obtained by the aforementioned processing in Step 36 or 37 can be used as they are, but in this embodiment the driving force command values are corrected by a value of the steering angle and the motor temperature. Here, in the correction in Step 38 using the value of the steering angle, the driving force command value for a motor for driving the wheel located on the innermost side is reduced from the driving force command value obtained by the aforementioned processing in Step 36 or 37 by taking the so-called "turning radius difference" into consideration. In addition, in the correction in Step 39 using the motor temperature, when the motor temperature has exceeded an allowable value or is estimated to exceed the same, the driving force command value is controlled to prevent disconnection or burning of a motor coil. It should be noted that these corrections are not an essential constituent feature of the present invention, and it goes without saying that these corrections may be omitted, or other corrections may be added, as required.

Returning to the aforementioned determination in Step 32, if a signal representing the amount of the brake pedal 22 depression been inputted, a determination is made that it is the case of braking (NO), and braking force command values are determined on the basis of the amount of the brake pedal 22 depression (Step 40). In an electric motor vehicle, during braking, it is possible to effect regenerative braking for operating the driving source motor in applying a regenerative brake.

If the driving force command values or braking force command values are determined in the aforementioned processing in Steps 36–40, the direction of rotation of the respective motors is finally determined on the basis of a value inputted from the forward/reverse/neutral changeover switch 23 (Step 41). Then, the driving force command values or the braking force command values and the direction of rotation thus determined are transmitted to the motor drivers 4(1)–4(4) shown in FIG. 2 (Step 42) so as to control the driving forces (outputs) of the respective motors 85–88 by controlling electric power supplied thereto.

As is apparent from the above, in accordance with the present invention, in cases where an increase of the efficiency of the electric motor vehicle is required, the motors are controlled individually on the basis of the vehicle speed, i.e., the rotational speed of the motors, which determines the efficiency of the mounted motors, as well as driving force values required of the vehicle in such a manner that the efficiency becomes optimum. In addition, when an appropriate driving force is required such as at the time of occurrence of slip, the motors for driving the respective wheels are controlled on the basis of the load applied to the wheels and driving force values required of the vehicle in such a manner that the driving forces of the respective wheels become optimum.

Accordingly, it is possible to increase the traveling distance while sufficiently securing a driving force required of a vehicle. At the same time, when a driving force is required, it is possible to reliably prevent the occurrence of slip by properly distributing the driving forces of the respective wheels, thereby enhancing the traveling performance as well as stability and safety during traveling.

What is claimed is:

1. An electric motor vehicle having a plurality of motors mounted thereon as a driving power source, comprising:
    speed detecting means for detecting a speed of the electric motor vehicle;
    determining means for determining total driving force required for the electric motor vehicle;
    calculating means for determining an individual driving force value for each of the plurality of motors in accordance with two separate inputs to said calculating means representative, respectively, of the detected speed and the determined total driving force, with a difference between an individual driving value for one wheel and an individual driving force value for another wheel being determined by values of both of said two inputs; and control means for individually controlling each of said motors on the basis of the individual driving force values determined by said calculating means.

2. An electric motor vehicle according to claim 1, additionally comprising:

a memory including a stored map having predetermined values for vehicle speed plotted against predetermined values for total driving force and a plurality of individual driving force values, for each of the plurality of motors, correlated with said predetermined values for vehicle speed and the total driving force;

wherein the calculating means determines an individual driving force value for each of the plurality of motors by matching the detected speed and the determined total driving force respectively with a predetermined value for vehicle speed and a predetermined value for total driving force in said map.

3. An electric motor vehicle according to claim 1, wherein said plurality of motors is divided into two groups by said control means controls, and wherein the motors in only one of said groups output said total driving force, responsive to a predetermined condition.

4. An electric motor vehicle according to claim 1, wherein said determining means determines said total driving force by detection of accelerator position.

5. An electric motor vehicle according to claim 1, further comprising means for detecting steering angle and wherein said calculating means determines said individual driving force values on the additional basis of the detected steering angle.

6. An electric motor vehicle according to claim 1, further comprising means for detecting temperatures of the plurality of motors and wherein said calculating means determines said individual driving force values on the additional basis of the detected temperatures.

7. An electric motor vehicle having two groups of motors mounted thereon as a driving power source, said vehicle comprising:

speed detecting means for detecting a speed of the electric motor vehicle;

determining means for determining total driving force required for the electric motor vehicle;

calculating means for determining an individual driving force value for each of the groups by matching the detected speed and the determined total driving force respectively with a predetermined value for vehicle speed and a predetermined value for total driving force in said map;

control means for individually controlling each of the motor groups on the basis of the individual driving force values determined by said calculating means.

8. An electric motor vehicle according to claim 7, additionally comprising:

a memory including a stored map having predetermined values for vehicle speed plotted against predetermined values for total driving force and a plurality of individual driving force values, for each group of motors, correlated with said predetermined values for the vehicle speed and for total driving force; and wherein the calculating means determines an individual driving force value for each of the plurality of motors by matching the detected speed and the determined total driving force respectively with a predetermined value for vehicle speed and a predetermined value for total driving force in said map.

9. An electric motor vehicle according to claim 7, wherein said determining means determines said total driving force by detection of accelerator position.

10. An electric motor vehicle according to claim 7, further comprising means for detecting steering angle and wherein said calculating means determines said individual driving force values on the additional basis of the detected steering angle.

11. An electric motor vehicle according to claim 7, further comprising means for detecting temperatures of the plurality of motors and wherein said calculating means determines said individual driving force values on the additional basis of the detected temperatures.

* * * * *

UNITED STATES PATENT AND TRADEMARK OFFICE
CERTIFICATE OF CORRECTION

PATENT NO. : 5,365,431
DATED : November 15, 1994
INVENTOR(S) : MINEZAWA et al

Figure 9A:
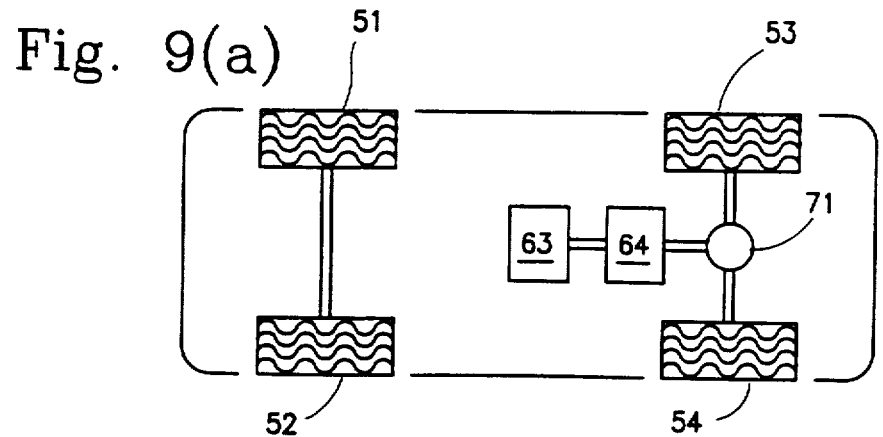
FIGS. 9(a), 9(b) and 9(c) are bottom plan schematic illustrations of various prior art electric vehicles.
Figure 9B:
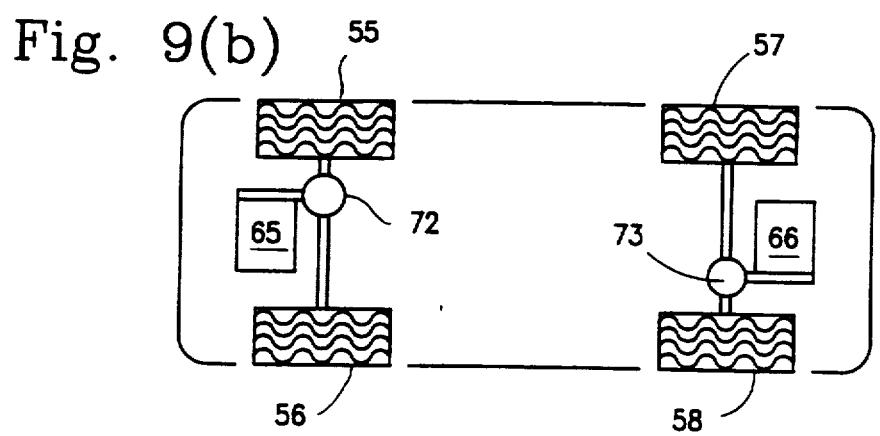
Figure 9C:
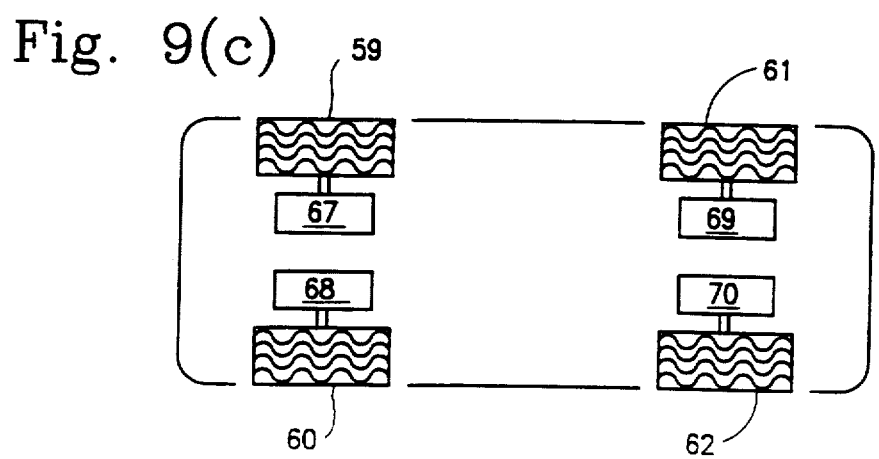

It is certified that error appears in the above-indentified patent and that said Letters Patent is hereby corrected as shown below:

IN THE DRAWINGS:

Please add the attached Figs. 9(a)-9(c) to the drawings.

Column 4, line 48, delete "this", second instance.

Column 5, line 5, delete "load" and insert --loads--.

Signed and Sealed this

Twenty-fourth Day of October, 1995

Attest:

BRUCE LEHMAN

*Attesting Officer*   Commissioner of Patents and Trademarks